Jan. 29, 1924.  
L. NEGRO  
METHOD OF PANIFICATION  
Filed Dec. 11, 1920  
1,482,245  
2 Sheets-Sheet 2
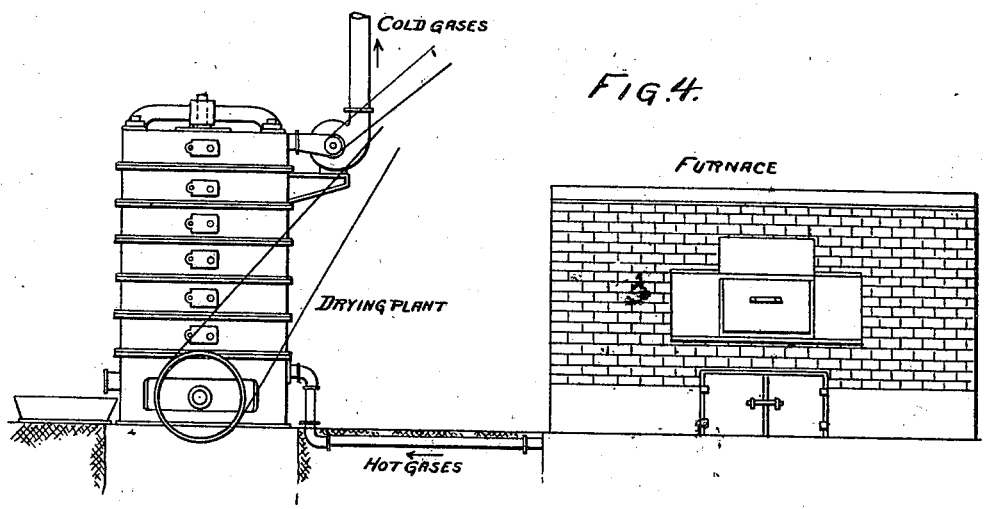
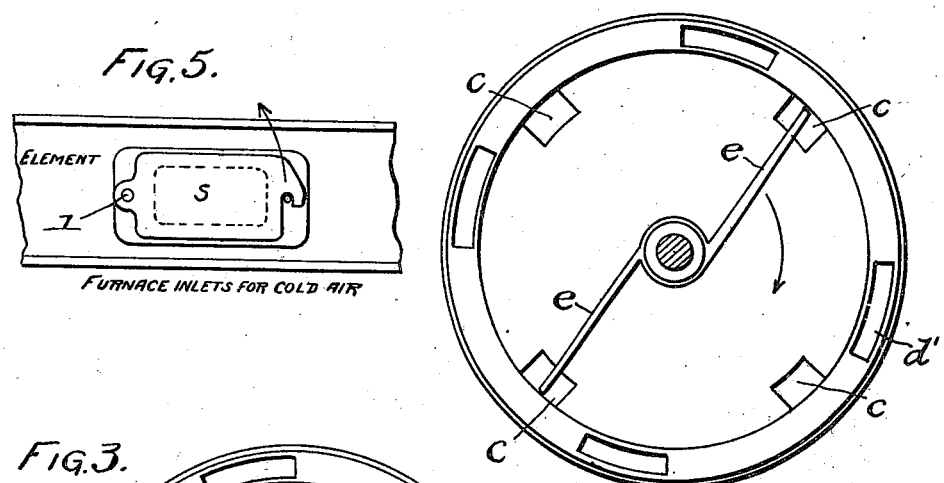
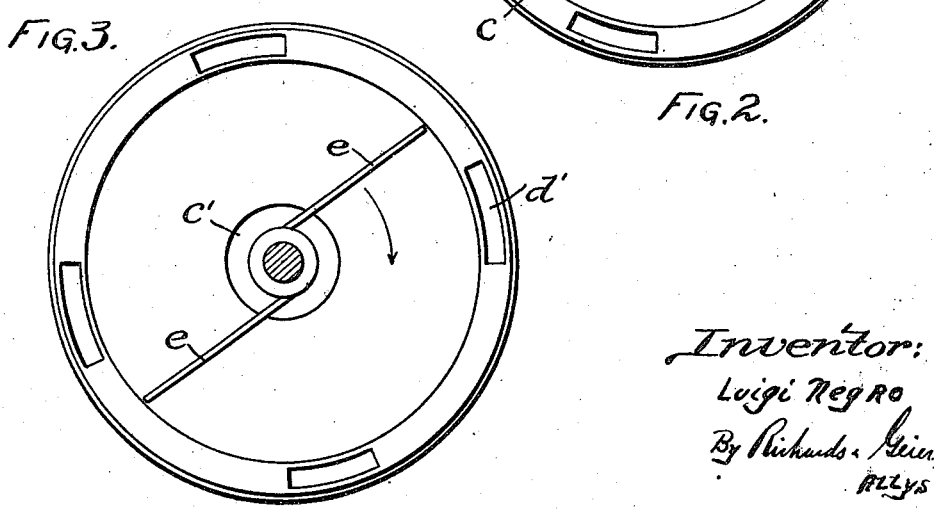
Inventor:  
Luigi Negro  
By Richards & Geier  
Attys Patented Jan. 29, 1924.

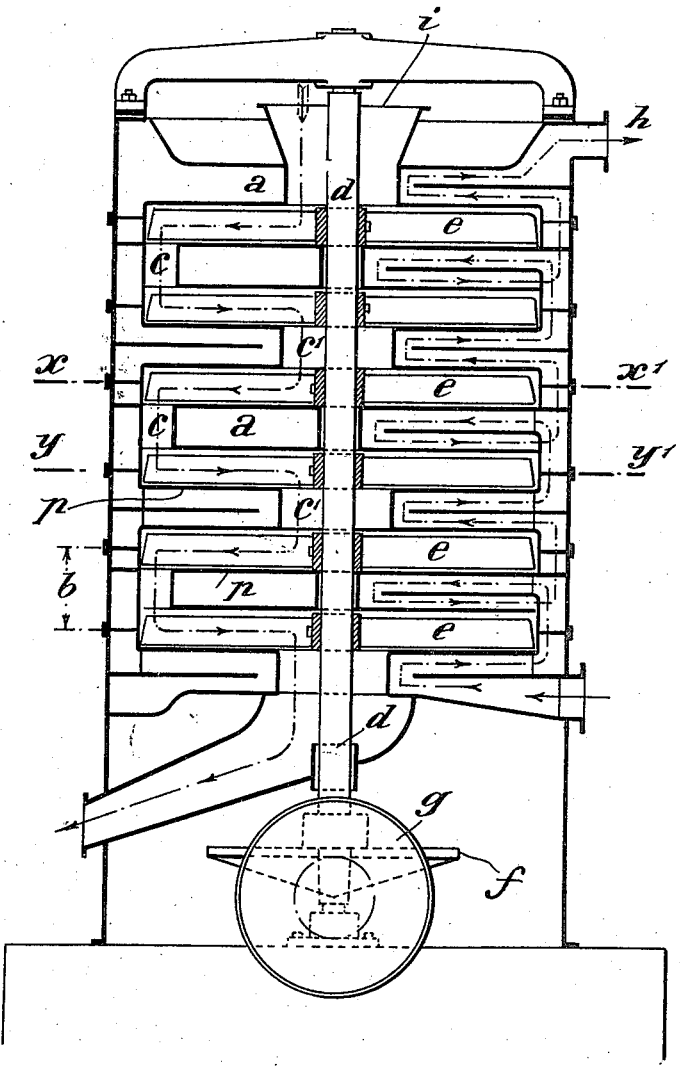

1,482,245

UNITED STATES PATENT OFFICE.

LUIGI NEGRO, OF BUCHAREST, RUMANIA.

METHOD OF PANIFICATION.

Application filed December 11, 1920. Serial No. 430,008.

*To all whom it may concern:*

I, LUIGI NEGRO, of No. 3 Strada Smardan, Bucharest, Rumania, a subject of the King of Italy, do hereby declare the nature of my invention for the Improvement in Methods of Panification and in what manner the same is to be performed, to be particularly described and ascertained in and by the following statement.

The invention relates to an improvement in panification, when wheat is directly used so as to utilize the whole of the mineral alimentary substances contained in the caryopsis of the grains, without either altering them or the gluten contained in the same grains, which confers to the wheat its baking capacity, while at the same time the diastases lodged in the caryopsis and in the embryon are eliminated. The diastase is known to be a soluble nitrogenous ferment perhaps an albumin or a mixture of albumins to be found only in barley or wheat grains, not in meal or flour, capable of converting starch and dextrin into sugar, an element acting efficiently between 60° and 75° C., but losing this capacity when heated to a greater temperature. When the diastase is not eliminated the product obtained by directly using wheat has an unpleasant appearance and a sourish taste, while when the diastase is destroyed the product is of fair appearance and of excellent flavour and what is more important the wheat bread can very well replace the bread obtained by using white flours.

I have found after many practical experiments that the best method of eliminating the diastases from wheat without injuring either the gluten or the mineral, alimentary substances contained in the wheat grains is to subject the wheat, after washing and cleaning, to a gradual drying up so as to expel nearly all the water content; then to expose the grains for about 30 minutes to a temperature of 100° C. (212° F.) while at the same time during the whole operation a mild continual ventilation must be effected as it is of the greatest importance not only to avoid jumps of temperature, but to have a progressive increment of the same, which is accomplished by providing means to control or modify the temperature in each stage of the operation.

One of the objects of the invention then relates to a heat process for directly employing wheat in panification for the purpose of destroying the diastases while preserving the good qualities of the mineral alimentary substances and of the gluten contained in the grains thus obtaining a very good bread of as excellent flavour and as fair appearance as that obtained by using fine white flours.

After the heat treatment the wheat after being rapidly cooled undergoes a maceration in water only limited to the time required to soften the grains, as it is not necessary to arrive at the germination point. When the maceration is completed the wheat is led into a cutting, kneading machine and from this moment undergoes the same treatment as that used when employing white flours; yeasting, setting, forming of loaves of the weight desired, baking and so on with the good result already pointed out that the diastases being destroyed no dark colour will result such as is usually obtained owing to the oxidation of the bran-extract formed during the kneading, nor will any colouring be produced in baking due to the partial liquefaction of amidone, both phenomena depending on the presence of the diastases.

Another object of the present invention is to provide an apparatus for drying and heating the wheat to satisfy all the conditions required by the heat process above mentioned.

The apparatus is substantially shown in the accompanying drawings in which:

Fig. 1 is a vertical section.

Figs. 2 and 3 are horizontal sections on lines $x$, $x'$ and $Y$, $Y'$ of Fig. 1.

Fig. 4 is an elevation of an apparatus or plant for carrying out the method and

Fig. 5 is a detail of a closure for the furnace inlets.

The apparatus consists of a series of circular compartments $a$ disposed in vertical columns and spaced apart at the distance $b$.

These compartments are built with a double bottom and have openings $c$ and $c'$ the openings $c$ disposed towards the periphery, and $c'$ towards the centre.

All the elements have at their centre a hole allowing the shaft $d$ to pass; on this shaft are suitably fixed in each compartment, wings $e$ attached to the periphery of the shaft at an angle with the radius, and the wings in each compartment are alternately arranged as shown in Figs. 2 and 3, to direct the grains alternately from the outside to the centre and vice versa.

This shaft is actuated by a conical gearing *f* and the pulley *g*.

The chambers formed by the double bottom of each compartment are traversed by a current of hot air coming from the bread ovens and aspirated by means of a ventilator (not shown); the passages for the air from the chamber of one compartment to the chamber of the next compartment are so formed that the direction of the air flow is from the circumference of each chamber and from the bottom towards the top through the openings *d'*. The air passes into each chamber and is directed towards the center by the baffles *n* flowing around the baffles and out of the openings *d'* into the next higher compartment. The passage of the air being indicated diagrammatically by the arrows at the right of Fig. 1.

The working of the apparatus is as follows: The wheat introduced through the central opening *i* is led to the circumference of the first compartment by the rotation of the wings, passes through the openings *c* and falls in the next lower compartment.

The wings of this compartment lead the wheat towards the centre and allow it to fall through the openings *c'* into the following compartment and so on. In this way, wheat passes from the higher compartment at lower temperature to the lower compartment at higher tempearture following a certain direction, the heated air following the opposite direction. The passage of the wheat is indicated diagrammatically by the arrows at the left of Fig. 1.

The planes *p* of such element are lined with a sheet of "eternit" (uralite) or other suitable material of suitable thickness, so as to prevent direct contact with the metallic parts.

An external piping supplies heated air to each separate compartment so as to maintain the temperature desired and a series of openings adapted to be closed by the pivoted closures *l* permits the introduction of cold air from the exterior, to diminish the temperature of the compartments as rerequired.

I am well aware that there are already grain driers or drying apparatus either for material such for example as peat, sand, etc., in case of peat to also collect the vapors or gases given off by the material during the drying process or for quick drying any moist materials neither in very large pieces, or in the form of a very fine powder. In all these apparatus as in the one according to the present invention, several similar constructive members or arrangements are similar having yet each its own peculiar features. All said apparatus are not claimed in the present invention, whose object is to disclose a drying device in which the temperature may be controlled and regulated at each stage of the operation it being necessary to subject the wheat to a gradually increasing heating while the grains are at the same time gently agitated, the purpose being firstly to deprive the wheat of water and secondly to destroy the diastases contained in the grains and to preserve their gluten and mineral substances in perfect conditions.

Having thus described my invention what I claim as new and desire to secure by Letters Patent of the United States is as follows:—

A method of panification in which the whole wheat is directly used which consists in subjecting the wheat grains after they have been washed and cleaned in the usual manner to a gradual drying until nearly all the water content has been expelled, then exposing the grains for about 30 minutes to a temperature of 100° C. (212° F.) while at the same time subjecting the grains to a ventilating current of heated air, while regulating the temperature of the air to avoid jumps of temperature, and to secure a progressive uniform increment of the temperature and thereby eliminate the diastases while keeping intact the good qualities of the mineral substances and of the gluten contained in the grains; then subjecting the wheat to a maceration in water to soften the grains; and finally subjecting the wheat to a cutting and kneading process after which the treatment is the same as that used when employing white flours.

In testimony whereof I have hereunto signed my name in the presence of two witnesses.

LUIGI NEGRO.

Witnesses:
  GEORGE ARANCY,
  O. GICONDI.